(12) United States Patent
Hinman

(10) Patent No.: US 10,595,253 B2
(45) Date of Patent: *Mar. 17, 2020

(54) SYSTEMS AND METHODS FOR DIRECTING MOBILE DEVICE CONNECTIVITY

(71) Applicant: Mimosa Networks, Inc., Santa Clara, CA (US)

(72) Inventor: Brian L. Hinman, Los Gatos, CA (US)

(73) Assignee: Mimosa Networks, Inc., Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/262,720

(22) Filed: Jan. 30, 2019

(65) Prior Publication Data
US 2019/0215745 A1 Jul. 11, 2019

Related U.S. Application Data

(63) Continuation of application No. 15/885,628, filed on Jan. 31, 2018, now Pat. No. 10,200,925, which is a
(Continued)

(51) Int. Cl.
*H04W 36/14* (2009.01)
*H04W 48/18* (2009.01)

(52) U.S. Cl.
CPC .......... *H04W 36/14* (2013.01); *H04W 48/18* (2013.01)

(58) Field of Classification Search
CPC ..... H04W 48/00; H04W 48/14; H04W 48/16; H04W 48/18; H04W 48/20; H04W 36/00;
(Continued)

(56) References Cited

U.S. PATENT DOCUMENTS

| 2,735,993 A | 2/1956 | Humphrey |
| 3,182,129 A | 5/1965 | Clark et al. |

(Continued)

FOREIGN PATENT DOCUMENTS

| CN | 104335654 A | 2/2015 |
| CN | 303453662 S | 11/2015 |

(Continued)

OTHER PUBLICATIONS

"International Search Report" and "Written Opinion of the International Search Authority," dated Nov. 26, 2013 in Patent Cooperation Treaty Application No. PCT/US2013/047406, filed Jun. 24, 2013, 9 pages.

(Continued)

*Primary Examiner* — Michael Y Mapa
(74) *Attorney, Agent, or Firm* — Carr & Ferrell LLP

(57) ABSTRACT

Methods and systems are provided herein for selecting networks for a mobile communications device. Methods for selecting a network connection for a mobile communications device may include receiving signals that comprise location information of the mobile communications device and selecting a first network type or a second network type for the mobile communications device based upon a magnitude of movement of the mobile communications device determined from the location information, the first network type comprising a network that is capable of handing off active sessions for the mobile communications device, the second network type comprising a network that having a reduced capacity or no capacity to hand off active sessions for the mobile communications device.

19 Claims, 6 Drawing Sheets

Related U.S. Application Data continuation of application No. 14/183,375, filed on Feb. 18, 2014, now Pat. No. 9,930,592.

(60) Provisional application No. 61/766,679, filed on Feb. 19, 2013.

(58) Field of Classification Search
CPC ..... H04W 36/04; H04W 36/14; H04W 36/16; H04W 36/24; H04W 36/32; H04W 84/10
USPC .............. 455/238.1, 435.1–444, 456.1–457; 370/331
See application file for complete search history.

(56) References Cited

U.S. PATENT DOCUMENTS

| | | |
|---|---|---|
| D227,476 S | 6/1973 | Kennedy |
| 4,188,633 A | 2/1980 | Frazita |
| 4,402,566 A | 9/1983 | Powell et al. |
| D273,111 S | 3/1984 | Hirata et al. |
| 4,543,579 A | 9/1985 | Teshirogi |
| 4,562,416 A | 12/1985 | Sedivec |
| 4,626,863 A | 12/1986 | Knop et al. |
| 4,835,538 A | 5/1989 | McKenna et al. |
| 4,866,451 A | 9/1989 | Chen |
| 4,893,288 A | 1/1990 | Maier et al. |
| 4,903,033 A | 2/1990 | Tsao et al. |
| 4,986,764 A | 1/1991 | Eaby et al. |
| 5,015,195 A | 5/1991 | Piriz |
| 5,226,837 A | 7/1993 | Cinibulk et al. |
| 5,231,406 A | 7/1993 | Sreenivas |
| D346,598 S | 5/1994 | McCay et al. |
| D355,416 S | 2/1995 | McCay et al. |
| 5,389,941 A | 2/1995 | Yu |
| 5,491,833 A | 2/1996 | Hamabe |
| 5,513,380 A | 4/1996 | Ivanov et al. |
| 5,539,361 A | 7/1996 | Davidovitz |
| 5,561,434 A | 10/1996 | Yamazaki |
| D375,501 S | 11/1996 | Lee et al. |
| 5,580,264 A | 12/1996 | Aoyama et al. |
| 5,684,495 A | 11/1997 | Dyott et al. |
| D389,575 S | 1/1998 | Grasfield et al. |
| 5,724,666 A | 3/1998 | Dent |
| 5,742,911 A | 4/1998 | Dumbrill et al. |
| 5,746,611 A | 5/1998 | Brown et al. |
| 5,764,696 A | 6/1998 | Barnes et al. |
| 5,797,083 A | 8/1998 | Anderson |
| 5,831,582 A | 11/1998 | Muhlhauser et al. |
| 5,966,102 A | 10/1999 | Runyon |
| 5,995,063 A | 11/1999 | Somoza et al. |
| 6,014,372 A | 1/2000 | Kent et al. |
| 6,067,053 A | 5/2000 | Runyon et al. |
| 6,137,449 A | 10/2000 | Kildal |
| 6,140,962 A | 10/2000 | Groenenboom |
| 6,176,739 B1 | 1/2001 | Denlinger et al. |
| 6,216,266 B1 | 4/2001 | Eastman et al. |
| 6,271,802 B1 | 8/2001 | Clark et al. |
| 6,304,762 B1 | 10/2001 | Myers et al. |
| D455,735 S | 4/2002 | Winslow |
| 6,421,538 B1 | 7/2002 | Byrne |
| 6,716,063 B1 | 4/2004 | Bryant et al. |
| 6,754,511 B1 | 6/2004 | Halford et al. |
| 6,847,653 B1 | 1/2005 | Smiroldo |
| D501,848 S | 2/2005 | Uehara et al. |
| 6,877,277 B2 | 4/2005 | Kussel et al. |
| 6,962,445 B2 | 11/2005 | Zimmel et al. |
| 7,075,492 B1 | 7/2006 | Chen et al. |
| D533,899 S | 12/2006 | Ohashi et al. |
| 7,173,570 B1 | 2/2007 | Wensink et al. |
| 7,187,328 B2 | 3/2007 | Tanaka et al. |
| 7,193,562 B2 | 3/2007 | Shtrom et al. |
| 7,212,162 B2 | 5/2007 | Jung et al. |
| 7,212,163 B2 | 5/2007 | Huang et al. |
| 7,245,265 B2 | 7/2007 | Kienzle et al. |
| 7,253,783 B2 | 8/2007 | Chiang et al. |
| 7,264,494 B2 | 9/2007 | Kennedy et al. |
| 7,281,856 B2 | 10/2007 | Grzegorzewska et al. |
| 7,292,198 B2 | 11/2007 | Shtrom et al. |
| 7,306,485 B2 | 12/2007 | Masuzaki |
| 7,316,583 B1 | 1/2008 | Mistarz |
| 7,324,057 B2 | 1/2008 | Argaman et al. |
| D566,698 S | 4/2008 | Choi et al. |
| 7,362,236 B2 | 4/2008 | Hoiness |
| 7,369,095 B2 | 5/2008 | Hirtzlin et al. |
| 7,380,984 B2 | 6/2008 | Wuester |
| 7,431,602 B2 | 10/2008 | Corona |
| 7,498,896 B2 | 3/2009 | Shi |
| 7,498,996 B2 | 3/2009 | Shtrom et al. |
| 7,507,105 B1 | 3/2009 | Peters et al. |
| 7,522,095 B1 | 4/2009 | Wasiewicz et al. |
| 7,542,717 B2 | 6/2009 | Green, Sr. et al. |
| 7,581,976 B2 | 9/2009 | Liepold et al. |
| 7,586,891 B1 | 9/2009 | Masciulli |
| 7,616,959 B2 | 11/2009 | Spenik et al. |
| 7,675,473 B2 | 3/2010 | Kienzle et al. |
| 7,726,997 B2 | 6/2010 | Kennedy et al. |
| 7,778,226 B2 | 8/2010 | Rayzman et al. |
| 7,857,523 B2 | 12/2010 | Masuzaki |
| 7,929,914 B2 | 4/2011 | Tegreene |
| RE42,522 E | 7/2011 | Zimmel et al. |
| 8,009,646 B2 | 8/2011 | Lastinger et al. |
| 8,069,465 B1 | 11/2011 | Bartholomay et al. |
| 8,111,678 B2 | 2/2012 | Lastinger et al. |
| 8,270,383 B2 | 9/2012 | Lastinger et al. |
| 8,275,265 B2 | 9/2012 | Kobyakov et al. |
| 8,325,695 B2 | 12/2012 | Lastinger et al. |
| D674,787 S | 1/2013 | Tsuda et al. |
| 8,345,651 B2 | 1/2013 | Lastinger et al. |
| 8,425,260 B2 | 4/2013 | Seefried et al. |
| 8,482,478 B2 | 7/2013 | Hartenstein |
| 8,515,434 B1 * | 8/2013 | Narendran ............ H04W 48/02 370/230 |
| 8,515,495 B2 | 8/2013 | Shang et al. |
| D694,740 S | 12/2013 | Apostolakis |
| 8,777,660 B2 | 7/2014 | Chiarelli et al. |
| 8,792,759 B2 | 7/2014 | Benton et al. |
| 8,827,729 B2 | 9/2014 | Gunreben et al. |
| 8,836,601 B2 | 9/2014 | Sanford et al. |
| 8,848,389 B2 | 9/2014 | Kawamura et al. |
| 8,870,069 B2 | 10/2014 | Bellows |
| 8,935,122 B2 | 1/2015 | Stisser |
| 9,001,689 B1 | 4/2015 | Hinman et al. |
| 9,019,874 B2 | 4/2015 | Choudhury et al. |
| 9,077,071 B2 | 7/2015 | Shtrom et al. |
| 9,107,134 B1 * | 8/2015 | Belser ................. H04W 52/281 |
| 9,130,305 B2 | 9/2015 | Ramos et al. |
| 9,161,387 B2 | 10/2015 | Fink et al. |
| 9,179,336 B2 | 11/2015 | Fink et al. |
| 9,191,081 B2 | 11/2015 | Hinman et al. |
| D752,566 S | 3/2016 | Hinman et al. |
| 9,295,103 B2 | 3/2016 | Fink et al. |
| 9,362,629 B2 | 6/2016 | Hinman et al. |
| 9,391,375 B1 | 7/2016 | Bales et al. |
| 9,407,012 B2 | 8/2016 | Shtrom et al. |
| 9,431,702 B2 | 8/2016 | Hartenstein |
| 9,504,049 B2 | 11/2016 | Hinman et al. |
| 9,531,114 B2 | 12/2016 | Ramos et al. |
| 9,537,204 B2 | 1/2017 | Cheng et al. |
| 9,577,340 B2 | 2/2017 | Fakharzadeh et al. |
| 9,693,388 B2 | 6/2017 | Fink et al. |
| 9,780,892 B2 | 10/2017 | Hinman et al. |
| 9,843,940 B2 | 12/2017 | Hinman et al. |
| 9,871,302 B2 | 1/2018 | Hinman et al. |
| 9,888,485 B2 | 2/2018 | Hinman et al. |
| 9,930,592 B2 | 3/2018 | Hinman |
| 9,949,147 B2 | 4/2018 | Hinman et al. |
| 9,986,565 B2 | 5/2018 | Fink et al. |
| 9,998,246 B2 | 6/2018 | Hinman et al. |
| 10,028,154 B2 | 7/2018 | Elson |
| 10,090,943 B2 | 10/2018 | Hinman et al. |
| 10,096,933 B2 | 10/2018 | Ramos et al. |
| 10,117,114 B2 | 10/2018 | Hinman et al. |
| 10,186,786 B2 | 1/2019 | Hinman et al. |
| 10,200,925 B2 | 2/2019 | Hinman |

(56) References Cited

U.S. PATENT DOCUMENTS

| | | |
|---|---|---|
| 10,257,722 B2 | 4/2019 | Hinman et al. |
| 10,425,944 B2 | 9/2019 | Fink et al. |
| 10,447,417 B2 | 10/2019 | Hinman et al. |
| 10,511,074 B2 | 12/2019 | Eberhardt et al. |
| 2001/0033600 A1 | 10/2001 | Yang et al. |
| 2002/0102948 A1 | 8/2002 | Stanwood et al. |
| 2002/0159434 A1 | 10/2002 | Gosior et al. |
| 2003/0013452 A1 | 1/2003 | Hunt et al. |
| 2003/0027577 A1 | 2/2003 | Brown et al. |
| 2003/0169763 A1 | 9/2003 | Choi |
| 2003/0222831 A1 | 12/2003 | Dunlap |
| 2003/0224741 A1 | 12/2003 | Sugar et al. |
| 2004/0002357 A1 | 1/2004 | Benveniste |
| 2004/0029549 A1 | 2/2004 | Fikart |
| 2004/0110469 A1 | 6/2004 | Judd et al. |
| 2004/0120277 A1* | 6/2004 | Holur ............ H04W 76/12 370/328 |
| 2004/0155819 A1 | 8/2004 | Martin et al. |
| 2004/0196812 A1 | 10/2004 | Barber |
| 2004/0196813 A1 | 10/2004 | Ofek et al. |
| 2004/0240376 A1 | 12/2004 | Wang et al. |
| 2004/0242274 A1 | 12/2004 | Corbett et al. |
| 2005/0032479 A1 | 2/2005 | Miller et al. |
| 2005/0058111 A1 | 3/2005 | Hung et al. |
| 2005/0124294 A1 | 6/2005 | Wentink |
| 2005/0143014 A1 | 6/2005 | Li et al. |
| 2005/0195758 A1 | 9/2005 | Chitrapu |
| 2005/0227625 A1 | 10/2005 | Diener |
| 2005/0254442 A1 | 11/2005 | Proctor, Jr. et al. |
| 2005/0271056 A1 | 12/2005 | Kaneko |
| 2005/0275527 A1 | 12/2005 | Kates |
| 2006/0025072 A1 | 2/2006 | Pan |
| 2006/0072518 A1 | 4/2006 | Pan et al. |
| 2006/0098592 A1 | 5/2006 | Proctor, Jr. et al. |
| 2006/0099940 A1 | 5/2006 | Pfleging et al. |
| 2006/0132359 A1 | 6/2006 | Chang et al. |
| 2006/0132602 A1 | 6/2006 | Muto et al. |
| 2006/0172578 A1 | 8/2006 | Parsons |
| 2006/0187952 A1 | 8/2006 | Kappes et al. |
| 2006/0211430 A1 | 9/2006 | Persico |
| 2006/0276073 A1 | 12/2006 | McMurray et al. |
| 2007/0001910 A1 | 1/2007 | Yamanaka et al. |
| 2007/0019664 A1 | 1/2007 | Benveniste |
| 2007/0035463 A1 | 2/2007 | Hirabayashi |
| 2007/0060158 A1 | 3/2007 | Medepalli et al. |
| 2007/0132643 A1 | 6/2007 | Durham et al. |
| 2007/0173199 A1 | 7/2007 | Sinha |
| 2007/0173260 A1 | 7/2007 | Love et al. |
| 2007/0210974 A1 | 9/2007 | Chiang |
| 2007/0223701 A1 | 9/2007 | Emeott et al. |
| 2007/0238482 A1 | 10/2007 | Rayzman et al. |
| 2007/0255797 A1 | 11/2007 | Dunn et al. |
| 2007/0268848 A1 | 11/2007 | Khandekar et al. |
| 2008/0109051 A1 | 5/2008 | Splinter et al. |
| 2008/0112380 A1 | 5/2008 | Fischer |
| 2008/0192707 A1 | 8/2008 | Xhafa et al. |
| 2008/0218418 A1 | 9/2008 | Gillette |
| 2008/0231541 A1 | 9/2008 | Teshirogi et al. |
| 2008/0242342 A1 | 10/2008 | Rofougaran |
| 2009/0046673 A1 | 2/2009 | Kaidar |
| 2009/0052362 A1 | 2/2009 | Meier et al. |
| 2009/0075606 A1 | 3/2009 | Shtrom et al. |
| 2009/0232026 A1 | 9/2009 | Lu |
| 2009/0233475 A1 | 9/2009 | Mildon et al. |
| 2009/0291690 A1 | 11/2009 | Guvenc et al. |
| 2009/0315792 A1 | 12/2009 | Miyashita et al. |
| 2010/0029282 A1 | 2/2010 | Stamoulis et al. |
| 2010/0039340 A1 | 2/2010 | Brown |
| 2010/0046650 A1 | 2/2010 | Jongren et al. |
| 2010/0067505 A1 | 3/2010 | Fein et al. |
| 2010/0085950 A1 | 4/2010 | Sekiya |
| 2010/0091818 A1 | 4/2010 | Sen et al. |
| 2010/0103065 A1 | 4/2010 | Shtrom et al. |
| 2010/0103066 A1 | 4/2010 | Shtrom et al. |
| 2010/0136978 A1 | 6/2010 | Cho et al. |
| 2010/0151877 A1* | 6/2010 | Lee ............ H04W 72/048 455/453 |
| 2010/0167719 A1 | 7/2010 | Sun |
| 2010/0171665 A1 | 7/2010 | Nogami |
| 2010/0171675 A1 | 7/2010 | Borja et al. |
| 2010/0189005 A1 | 7/2010 | Bertani et al. |
| 2010/0202613 A1 | 8/2010 | Ray et al. |
| 2010/0210147 A1 | 8/2010 | Hauser |
| 2010/0216412 A1 | 8/2010 | Rofougaran |
| 2010/0225529 A1 | 9/2010 | Landreth et al. |
| 2010/0238083 A1 | 9/2010 | Malasani |
| 2010/0315307 A1 | 12/2010 | Syed et al. |
| 2010/0322219 A1 | 12/2010 | Fischer et al. |
| 2011/0006956 A1 | 1/2011 | McCown |
| 2011/0028097 A1 | 2/2011 | Memik et al. |
| 2011/0032159 A1 | 2/2011 | Wu et al. |
| 2011/0044186 A1 | 2/2011 | Jung et al. |
| 2011/0090129 A1 | 4/2011 | Weily et al. |
| 2011/0103309 A1 | 5/2011 | Wang et al. |
| 2011/0111715 A1 | 5/2011 | Buer et al. |
| 2011/0112717 A1* | 5/2011 | Resner ............ G07C 5/008 701/31.4 |
| 2011/0133996 A1 | 6/2011 | Alapuranen |
| 2011/0170424 A1 | 7/2011 | Safavi |
| 2011/0172916 A1* | 7/2011 | Pakzad ............ G01C 21/14 701/533 |
| 2011/0182260 A1 | 7/2011 | Sivakumar et al. |
| 2011/0182277 A1 | 7/2011 | Shapira |
| 2011/0194644 A1 | 8/2011 | Liu et al. |
| 2011/0206012 A1* | 8/2011 | Youn ............ H04W 36/30 370/332 |
| 2011/0241969 A1 | 10/2011 | Zhang et al. |
| 2011/0243291 A1 | 10/2011 | McAllister et al. |
| 2011/0256874 A1* | 10/2011 | Hayama ............ H04W 36/30 455/437 |
| 2011/0291914 A1 | 12/2011 | Lewry et al. |
| 2012/0008542 A1 | 1/2012 | Koleszar et al. |
| 2012/0040700 A1 | 2/2012 | Gomes et al. |
| 2012/0057533 A1 | 3/2012 | Junell et al. |
| 2012/0093091 A1 | 4/2012 | Kang et al. |
| 2012/0115487 A1 | 5/2012 | Josso |
| 2012/0134280 A1 | 5/2012 | Rotvold et al. |
| 2012/0140651 A1 | 6/2012 | Nicoara et al. |
| 2012/0238201 A1 | 9/2012 | Du et al. |
| 2012/0263145 A1* | 10/2012 | Marinier ............ H04W 36/22 370/331 |
| 2012/0282868 A1 | 11/2012 | Hahn |
| 2012/0299789 A1 | 11/2012 | Orban et al. |
| 2012/0314634 A1 | 12/2012 | Sekhar |
| 2013/0003645 A1 | 1/2013 | Shapira et al. |
| 2013/0005350 A1* | 1/2013 | Campos ............ H04W 48/18 455/456.1 |
| 2013/0023216 A1 | 1/2013 | Moscibroda et al. |
| 2013/0064161 A1 | 3/2013 | Hedayat et al. |
| 2013/0082899 A1 | 4/2013 | Gomi |
| 2013/0095747 A1 | 4/2013 | Moshfeghi |
| 2013/0128858 A1 | 5/2013 | Zou et al. |
| 2013/0176902 A1 | 7/2013 | Wentink et al. |
| 2013/0182652 A1 | 7/2013 | Tong et al. |
| 2013/0195081 A1 | 8/2013 | Merlin et al. |
| 2013/0210457 A1 | 8/2013 | Kummetz |
| 2013/0223398 A1 | 8/2013 | Li et al. |
| 2013/0234898 A1 | 9/2013 | Leung et al. |
| 2013/0271319 A1 | 10/2013 | Trerise |
| 2013/0286950 A1 | 10/2013 | Pu |
| 2013/0286959 A1 | 10/2013 | Lou et al. |
| 2013/0288735 A1 | 10/2013 | Guo |
| 2013/0301438 A1 | 11/2013 | Li et al. |
| 2013/0322276 A1 | 12/2013 | Pelletier et al. |
| 2013/0322413 A1 | 12/2013 | Pelletier et al. |
| 2014/0024328 A1 | 1/2014 | Balbien et al. |
| 2014/0051357 A1 | 2/2014 | Steer et al. |
| 2014/0098748 A1 | 4/2014 | Chan et al. |
| 2014/0113676 A1 | 4/2014 | Hamalainen et al. |
| 2014/0145890 A1 | 5/2014 | Ramberg et al. |
| 2014/0154895 A1 | 6/2014 | Poulsen et al. |
| 2014/0185494 A1 | 7/2014 | Yang et al. |
| 2014/0191918 A1 | 7/2014 | Chang et al. |
| 2014/0198867 A1 | 7/2014 | Sturkovich et al. |

(56) References Cited

U.S. PATENT DOCUMENTS

| | | |
|---|---|---|
| 2014/0206322 A1 | 7/2014 | Dimou et al. |
| 2014/0225788 A1 | 8/2014 | Schulz et al. |
| 2014/0233613 A1 | 8/2014 | Fink et al. |
| 2014/0235244 A1 | 8/2014 | Hinman |
| 2014/0253378 A1 | 9/2014 | Hinman |
| 2014/0253402 A1 | 9/2014 | Hinman et al. |
| 2014/0254700 A1 | 9/2014 | Hinman et al. |
| 2014/0256166 A1 | 9/2014 | Ramos et al. |
| 2014/0320306 A1 | 10/2014 | Winter |
| 2014/0320377 A1 | 10/2014 | Cheng et al. |
| 2014/0328238 A1 | 11/2014 | Seok et al. |
| 2014/0355578 A1 | 12/2014 | Fink et al. |
| 2014/0355584 A1 | 12/2014 | Fink et al. |
| 2015/0002335 A1 | 1/2015 | Hinman et al. |
| 2015/0002354 A1 | 1/2015 | Knowles |
| 2015/0015435 A1 | 1/2015 | Shen et al. |
| 2015/0215952 A1 | 7/2015 | Hinman et al. |
| 2015/0256275 A1 | 9/2015 | Hinman et al. |
| 2015/0263816 A1 | 9/2015 | Hinman et al. |
| 2015/0319584 A1 | 11/2015 | Fink et al. |
| 2015/0321017 A1 | 11/2015 | Perryman et al. |
| 2015/0325945 A1 | 11/2015 | Ramos et al. |
| 2015/0327272 A1 | 11/2015 | Fink et al. |
| 2015/0365866 A1 | 12/2015 | Hinman et al. |
| 2016/0119018 A1 | 4/2016 | Lindgren et al. |
| 2016/0149634 A1 | 5/2016 | Kalkunte et al. |
| 2016/0149635 A1 | 5/2016 | Hinman et al. |
| 2016/0211583 A1 | 7/2016 | Lee et al. |
| 2016/0240929 A1 | 8/2016 | Hinman et al. |
| 2016/0338076 A1 | 11/2016 | Hinman et al. |
| 2016/0365666 A1 | 12/2016 | Ramos et al. |
| 2016/0366601 A1 | 12/2016 | Hinman et al. |
| 2017/0048647 A1 | 2/2017 | Jung et al. |
| 2017/0201028 A1 | 7/2017 | Eberhardt et al. |
| 2017/0238151 A1 | 8/2017 | Fink et al. |
| 2017/0294975 A1 | 10/2017 | Hinman et al. |
| 2018/0034166 A1 | 2/2018 | Hinman |
| 2018/0035317 A1 | 2/2018 | Hinman et al. |
| 2018/0083365 A1 | 3/2018 | Hinman et al. |
| 2018/0084563 A1 | 3/2018 | Hinman et al. |
| 2018/0160353 A1 | 6/2018 | Hinman |
| 2018/0192305 A1 | 7/2018 | Hinman et al. |
| 2018/0199345 A1 | 7/2018 | Fink et al. |
| 2018/0241491 A1 | 8/2018 | Hinman et al. |
| 2019/0006789 A1 | 1/2019 | Ramos et al. |
| 2019/0214699 A1 | 7/2019 | Eberhardt et al. |
| 2019/0273326 A1 | 9/2019 | Sanford et al. |
| 2020/0015231 A1 | 1/2020 | Fink et al. |

FOREIGN PATENT DOCUMENTS

| | | |
|---|---|---|
| CN | 105191204 A | 12/2015 |
| EM | 002640177 | 2/2015 |
| EP | 1384285 B1 | 6/2007 |
| WO | WO2014137370 A1 | 9/2014 |
| WO | WO2014138292 A1 | 9/2014 |
| WO | WO2014193394 A1 | 12/2014 |
| WO | WO2015112627 A1 | 7/2015 |
| WO | WO2017123558 A1 | 7/2017 |
| WO | WO2018022526 A1 | 2/2018 |
| WO | WO2019136257 A1 | 7/2019 |
| WO | WO2019168800 A1 | 9/2019 |

OTHER PUBLICATIONS

"International Search Report" and "Written Opinion of the International Search Authority," dated Aug. 9, 2013 in Patent Cooperation Treaty Application No. PCT/US2013/043436, filed May 30, 2013, 13 pages.

"International Search Report" and "Written Opinion of the International Search Authority," dated Jul. 1, 2014 in Patent Cooperation Treaty Application No. PCT/US2014/020880, filed Mar. 5, 2014, 14 pages.

"International Search Report" and "Written Opinion of the International Search Authority," dated Jun. 29, 2015 in Patent Cooperation Treaty Application No. PCT/US2015/012285, filed Jan. 21, 2015, 15 pages.

Hinman et al., U.S. Appl. No. 61/774,632, filed Mar. 7, 2013, 23 pages.

Office Action dated Jun. 15, 2015 in Chinese Design Patent Application 201530058063.8, filed Mar. 11, 2015, 1 page.

Notice of Allowance dated Sep. 8, 2015 in Chinese Design Patent Application 201530058063.8, filed Mar. 11, 2015, 3 pages.

Weisstein, Eric, "Electric Polarization", Wolfram Reasearch [online], Retrieved from the Internet [retrieved Mar. 23, 2017] <URL:http://scienceworld.wolfram.com/physics/ElectricPolarization.html>, 2007, 1 page.

Liu, Lingjia et al., "Downlink MIMO in LTE-Advanced: SU-MIMO vs. MU-MIMO," IEEE Communications Magazine, Feb. 2012, pp. 140-147.

"International Search Report" and "Written Opinion of the International Searching Authority," Patent Cooperation Treaty Application No. PCT/US2017/012884, dated Apr. 6, 2017, 9 pages.

"Office Action," Chinese Patent Application No. 201580000078.6, dated Nov. 3, 2017, 5 pages [10 pages including translation].

"International Search Report" and "Written Opinion of the International Searching Authority," Patent Cooperation Treaty Application No. PCT/US2017/043560, dated Nov. 16, 2017, 11 pages.

"Office Action," Chinese Patent Application No. 201580000078.6, dated Jul. 30, 2018, 5 pages [11 pages including translation].

"Office Action," Chinese Patent Application No. 201580000078.6, dated Oct. 31, 2018, 3 pages [6 pages including translation].

"Notice of Allowance," Chinese Patent Application No. 201580000078. 6, dated Feb. 11, 2019, 2 pages.

"International Search Report" and "Written Opinion of the International Search Authority," dated Mar. 22, 2019 in Patent Cooperation Treaty Application No. PCT/US2019/012358, filed Jan. 4, 2019, 9 pages.

FCC Regulations, 47 CFR § 15.407, 63 FR 40836, Jul. 31, 1998, as amended at 69 FR 2687, Jan. 20, 2004; 69 FR 54036, Sep. 7, 2004; pp. 843-846.

Teshirogi, Tasuku et al., "Wideband Circularly Polarized Array Antenna with Sequential Rotations and Phase Shift of Elements," Proceedings of the International Symposium on Antennas and Propagation, 1985, pp. 117-120.

"Sector Antennas," Radiowaves.com, [online], [retrieved Oct. 10, 2019], Retrieved from the Internet: <URL:https://www.radiowaves.com/en/products/sector-antennas>, 4 pages.

KP Performance Antennas Search Results for Antennas, Sector, Single, [online], KPPerformance.com [retrieved Oct. 10, 2019], Retrieved from the Internet: <URL:https://www.kpperformance.com/search? Category=Antennas&Rfpsan99design=Sector&Rfpsan99option= Single&view_type=grid>, 6 pages.

* cited by examiner

SYSTEMS AND METHODS FOR DIRECTING MOBILE DEVICE CONNECTIVITY

CROSS REFERENCE TO RELATED APPLICATIONS

This patent application is a continuation of, and claims priority benefit of, U.S. patent application Ser. No. 15/885,628, filed Jan. 31, 2018, now U.S. Pat. No. 10,200,925, issued Feb. 5, 2019, entitled "Systems and Methods for Directing Mobile Device Connectivity", which is a continuation of, and claims the priority benefit of, U.S. patent application Ser. No. 14/183,375, filed Feb. 18, 2014, now U.S. Pat. No. 9,930,592, issued Mar. 27, 2018, entitled "Systems and Methods for Directing Mobile Device Connectivity", which claims the priority benefit of U.S. Provisional Application Ser. No. 61/766,679, filed on Feb. 19, 2013, titled "System and Method for GPS-Derived Velocity to Direct Cellular Phone Connectivity." All of the aforementioned disclosures are hereby incorporated by reference herein in their entireties including all references and appendices cited therein.

FIELD OF THE INVENTION

The present technology relates to systems and methods for multi-band radios. In particular, the present system and method enables a multi-band radio to select a network for voice and data communication based on radio velocity, as determined by a GPS receiver, along with signal strength.

SUMMARY

The present technology is directed, in some embodiments, to a method for selecting a network connection for a mobile communications device. The method comprises: (a) receiving signals that comprise location information of the mobile communications device; and (b) selecting a first network type or a second network type for the mobile communications device based upon a magnitude of movement of the mobile communications device determined from the location information, the first network type comprising a network that is capable of handing off active sessions for the mobile communications device, the second network type comprising a network that having a reduced capacity or no capacity to hand off active sessions for the mobile communications device.

The present technology is directed, in some embodiments, to a method for selecting a network connection for a mobile communications device that comprises: (a) receiving signals that comprise location information of the mobile communications device; (b) estimating movement of the mobile communications device from the location information; and (c) based upon a magnitude of the movement of the mobile communications device, dividing voice sessions and data sessions for the mobile communications device between a first network type and a second network type, the first network type comprising a network that is capable of handing off active sessions for the mobile communications device, the second network type comprising a network that having a reduced capacity or no capacity to hand off active sessions for the mobile communications device.

The present technology is directed, in some embodiments, to a method comprising: (a) receiving a first signal from a first network transmitter, the first signal including an indication of a first strength of the first signal; (b) receiving a second signal from a second network transmitter, the second signal including an indication of a second strength of the second signal; (c) determining a velocity of a mobile communications device; and (d) selecting one of the first network and the second network for one of data and voice transmissions based on at least one of the velocity, the first strength, and the second strength.

The present technology is directed, in some embodiments, to a mobile communications device, comprising: (a) a processor; and (b) a memory for storing executable instructions, the instructions being executed by the processor to: (i) selecting a first network type or a second network type for the mobile communications device based upon a magnitude of movement of the mobile communications device determined from the location information, the first network type comprising a network that is capable of handing off active sessions for the mobile communications device, the second network type comprising a network that having a reduced capacity or no capacity to hand off active sessions for the mobile communications device.

BRIEF DESCRIPTION OF THE DRAWINGS

Certain embodiments of the present technology are illustrated by the accompanying figures. It will be understood that the figures are not necessarily to scale and that details not necessary for an understanding of the technology or that render other details difficult to perceive may be omitted. It will be understood that the technology is not necessarily limited to the particular embodiments illustrated herein.

DETAILED DESCRIPTION OF EMBODIMENTS

Figure 1:
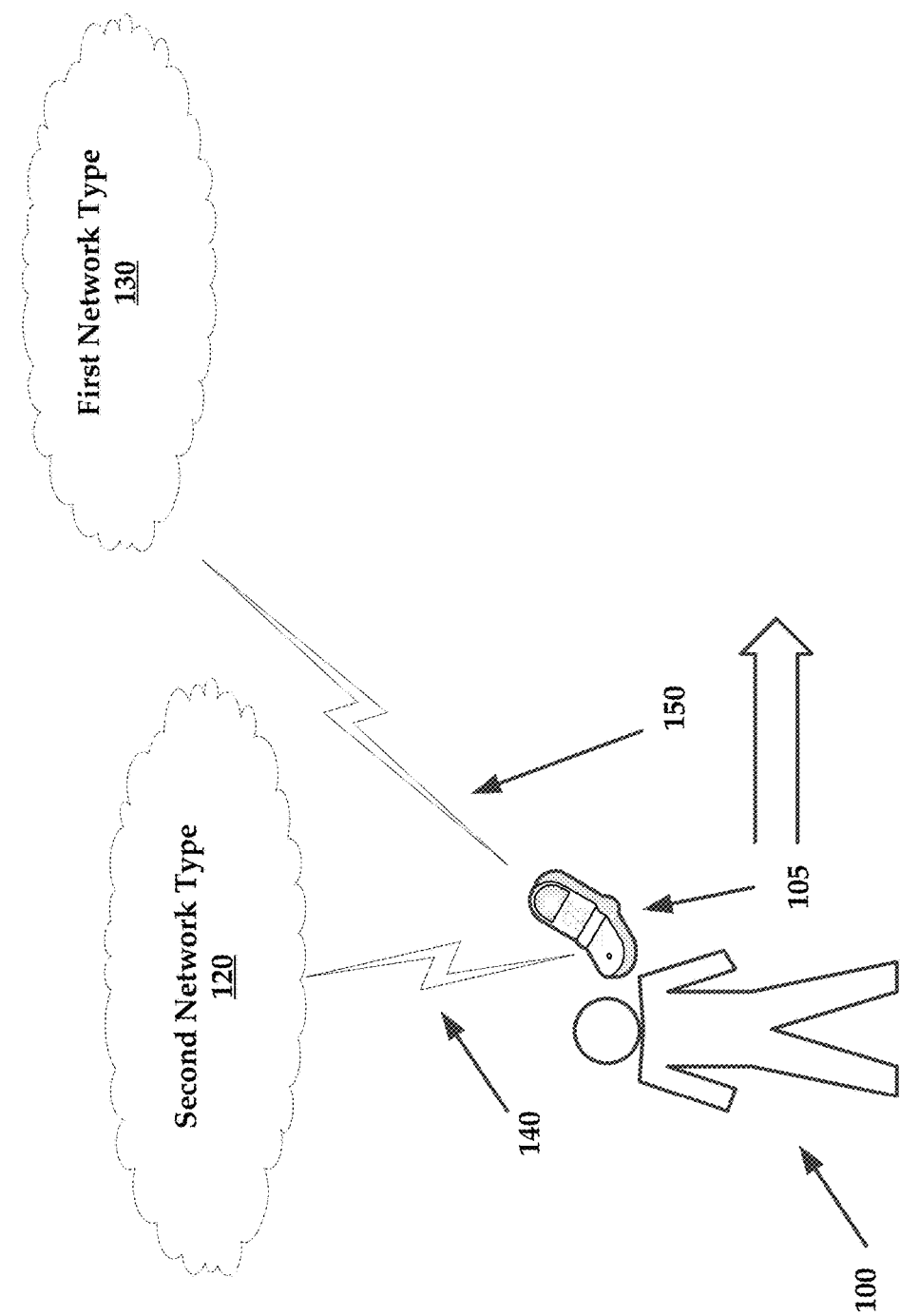
FIG. 1 is a schematic diagram of a system that implements the present technology.

In the following description, for purposes of explanation, numerous specific details are set forth in order to provide a thorough understanding of the disclosure. It will be apparent, however, to one skilled in the art, that the disclosure may be practiced without these specific details. In other instances, structures and devices are shown at block diagram form only in order to avoid obscuring the disclosure.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The cellular network is taxed by a growing number of subscribers and increasing data demands. "Small cells" and WiFi hotspots have emerged as means to lighten the load on the traditional macro-cell network. Conventionally, a mobile phone, PDA or other mobile communication device selects between the macro-cell, a WiFi hotspot, or a small cell on the basis of signal strength. However, some small cells and WiFi hotspots cannot sustain a connection from a mobile user moving at a high velocity, such as traveling in an automobile.

A small cell network may be understood to include, for example, femtocells, picocells, and microcells—just to name a few. A femtocell may be understood to include a short range cellular network that is used to provide cellular connectivity in a given location. For example, a femtocell access point may be placed in a home where cellular service from a macro cell network is poor. The femtocell access point may provide a higher strength cellular connectivity for user equipment in the home or within range of the femtocell. Microcells may be also referred to as femtocells.

A picocell is an extension of a macro cell network and provides increased connectivity for users of a macro cell (e.g., cellular network) in locations where macro cell connectivity may be reduced. For example, picocells may be placed on the external portions of buildings or on street lights of other similar structures. These picocells act as an extension of the macro cell network, providing adequate handoff capabilities for user equipment that operates in a given location. For example, cell phone users may be handed off from picocell to picocell in an urban area. The picocells are the extension of a macro cell network.

Regardless of the specific definitions of networks used herein and in the art, the user equipment may be configured to select between two basic network types. The first network type is a network that is capable of handing off user equipment sessions when the user equipment moves during a session. Examples of this first network type include a macro cell and/or a picocell that is used to extend the macro cell network. A second network type is a network that has a reduce capacity (or no capacity) to handoff active sessions for user equipment. Examples of these networks include a WiFi network, a hotspot network, and/or a femtocell network—just to name a few. If the user equipment determines that it is moving, the user equipment may select a network of the first network type. Alternatively, if the user equipment determines that it is not moving, the user equipment may select a network of the second network type. The user equipment may vacillate between networks as the movement of the user equipment changes over time. For example, the first network type may be selected when the user equipment is traveling in a car, and the second network type may be selected when the user returns home and is within range of the user's WiFi network.

These networks are relatively low-powered radio access nodes, relative to macro-cells, and often have coverage ranges that are smaller in area than those of macro-cell networks. These small cells are used to offload bandwidth (referred to as mobile data offloading) from macro-cell networks such as 4G LTE, CDMA2000, TD-SCDMA, W-CDMA, and WiMax, for example. Small cells are used to provide wireless networking for UEs in a small area, such as a hotel, a restaurant, a retail establishment, or other location where wireless networking is desired. The use of small cells will only increase over time as macro-cell network operators look to offload more mobile data from their macro-cell networks in an effort to remedy latency and bandwidth issues in their macro-cell networks.

The present technology, in some embodiments, uses the GPS receiver, which is now becoming common in cell phones, to allow the phone to determine the appropriate network to route its traffic.

If the phone determines that it has been relatively stationary over the last few minutes (or other appropriate time period), it selects the WiFi hotspot or small cell. If the phone determines that it has been moving rapidly recently, it selects the cellular macro-cell, as this network was designed to sustain calls from users in automobiles. During the connection, the phone continues to monitor its velocity, and change networks as required.

Conventional multi-band radios select between available networks based on signal strength. The present technology recognizes that some networks may be preferable based on other considerations. For example, a network carrier may prefer that as many users as possible use small cells or WiFi networks in order to reduce demand on the macro-cell network. However, some small cells, such as femtocells, and WiFi are not adapted to provide seamless handoffs between adjacent networks when a radio transmitter/receiver is in motion.

Therefore, for users who are moving, either in a car or walking, a conventional macro-cell network may be preferred for obtaining seamless communication. On the other hand, stationary users may prefer a small cell network or WiFi to avoid data charges or for other reasons, and the carrier may also prefer this arrangement when possible to avoid over use of a network. Therefore, the present technology utilizes a GPS receiver, or other location determination service (for instance GLONASS or cellphone triangulation), to determine a velocity for the mobile communication device. If the device is moving at a velocity greater than a predetermined minimum, then the mobile communication device and/or the network, may determine that the mobile device should communicate via the macro-cell network, so long as the signal strength in the macro-cell network exceeds a minimum requirement. Alternatively, if the velocity of the mobile device is lower than the predetermined minimum velocity, and/or is stationary for a minimum period of time, and if the signal strength for an available small cell or WiFi network is greater than the minimum signal strength, then the mobile device may select the small cell or WiFi network for communication of voice and/or data.

In still further alternatives, data and voice, and/or other categories of transmitted materials, may be split between available networks based on signal strength, a velocity, and/or a requirement of seamless communication (e.g., for voice and or video).

Still further alternatives may use a Smartphone or other Internet-enabled device having access to a mapping program (e.g., Google® maps) to assist in determining whether to remain in a small cell or WiFi network, and/or change to a macro-cell network.

The term macro-cell network will be understood to include a network that is configured to efficiently maintain user equipment (UEs) voice and data sessions, for example mobile terminal UEs (e.g., cellphones) that traverse through a geographical area. These mobile UEs may be serviced by multiple cellular network towers (e.g., cell base station), for example as they move, being handed off from cell tower to cell tower as needed.

In some embodiments, the UE may dynamically select an appropriate network to use based upon the velocity and/or signal strength thresholds described above. Thus, the UE may be configured to monitor location based information about the UE from, for example, GSP information generated by a GPS module within the UE. This location information may be used to calculate a velocity of the UE, which is indicative of the movement of the UE. Other methods for determining the movement of the UE that can be expressed as, or used to calculated velocity may also likewise be utilized, such as an accelerometer module of the UE. For example, accelerometer module output may be used by the UE to infer that the UE is being carried by a user while walking. This information may be used as the basis to determine that the macro-cell network should be selected. In sum, the ability for the UE to select an appropriate network may reside entirely within the UE.

In other embodiments, the UE may dynamically select an appropriate network based upon signals received a server or other third party system that monitors the location information of the UE. For example, the macro-cell network may inform the UE that it should use a second network type when the macro-cell network determines that the UE is stationary (or has a velocity that falls below a threshold value established for velocity). Thus, in some embodiments, the ability for the UE to select an appropriate network may be affected from systems or networks outside the UE itself.

The present technology may also be implemented in smart devices, such as with machine-to-machine (M2M) devices, in what is often referred to as the "Internet of Things". These smart devices may include wireless chipsets and GPS modules, which are used to periodically report back their location and network conditions to a server. These smart devices may be integrated into other systems such as appliances, vehicles, laptops, and other similar devices.

FIG. 1 illustrates an exemplary system for selecting between networks. In FIG. 1, user 100 having Smartphone 105 (exemplary UE) is making a telephone call and/or using a data resource (e.g., email or the Internet). Smartphone 105 receives signal 140 from second network type 120 and signal 150 from a first network type 130. Generally, the second network type 120 is a small cell network or WiFi network or other network that has a reduced (or no) capacity to hand off active user sessions, and first network type 130 is a macro-cell network, such as a cell network or other network that has the ability to effectively hand off active users sessions. To be sure, an active session is a current session for user equipment including, for example, an active call, an on-hold call, media streaming, messaging service, or other similar types of sessions that occur over a network.

The Smartphone 105 includes logic stored in memory that is executed by a processor of the Smartphone 105 to dynamically select an appropriate network for the Smartphone 105 based upon the movement or lack of movement of the Smartphone 105. This logic may include a GPS module that is configured to track the GPS location of Smartphone 105 and calculate a velocity of the Smartphone 105. Alternatively, the GPS module may determine that the GPS location of the Smartphone is different within a given period of time. For example, the Smartphone 105 may be located a first position at time zero, and a second position at second time that is approximately one minute later than time zero. Additionally, the first and second positions are removed from one another by approximately a mile. Thus, the GPS module may infer that the Smartphone 105 is mobile and traveling at a high rate of speed.

In general, if the Smartphone 105 is mobile, the logic may specify that the Smartphone 105 should utilize the first network type 130. On the other hand, if the Smartphone 105 is determined to be stationary, the logic may direct the Smartphone 105 to utilize the second network type 120. As mentioned above, thresholds may be established that specify how "mobile" the Smartphone 105 must be to warrant use of a particular network. For example, if the Smartphone 105 is moving at a rate of speed that is greater than one mile per hour, the Smartphone 105 may select a second network type such as a small cell or WiFi network. Alternatively, if above the threshold the Smartphone 105 may select the first network type 130 (e.g. a macro-cell network). Advantageously, if user 100 is moving at a sufficient pace that handovers between adjacent WiFi, small cell, ad-hoc, or other similar networks would be difficult or impossible, then smartphone 105 would use first network type 130, which may be a macro-cell network.

Velocity or pace of travel may be inferred from a relatively few number of data points, such as the example given above with respect to a first and second positions of the Smartphone 105. Thus, the GPS module need not continually monitor the location of the Smartphone 105 in order make an appropriate network selection, although in some embodiments continuous or semi-continuous monitoring of the location of the Smartphone 105 may be employed.

Figure 2:
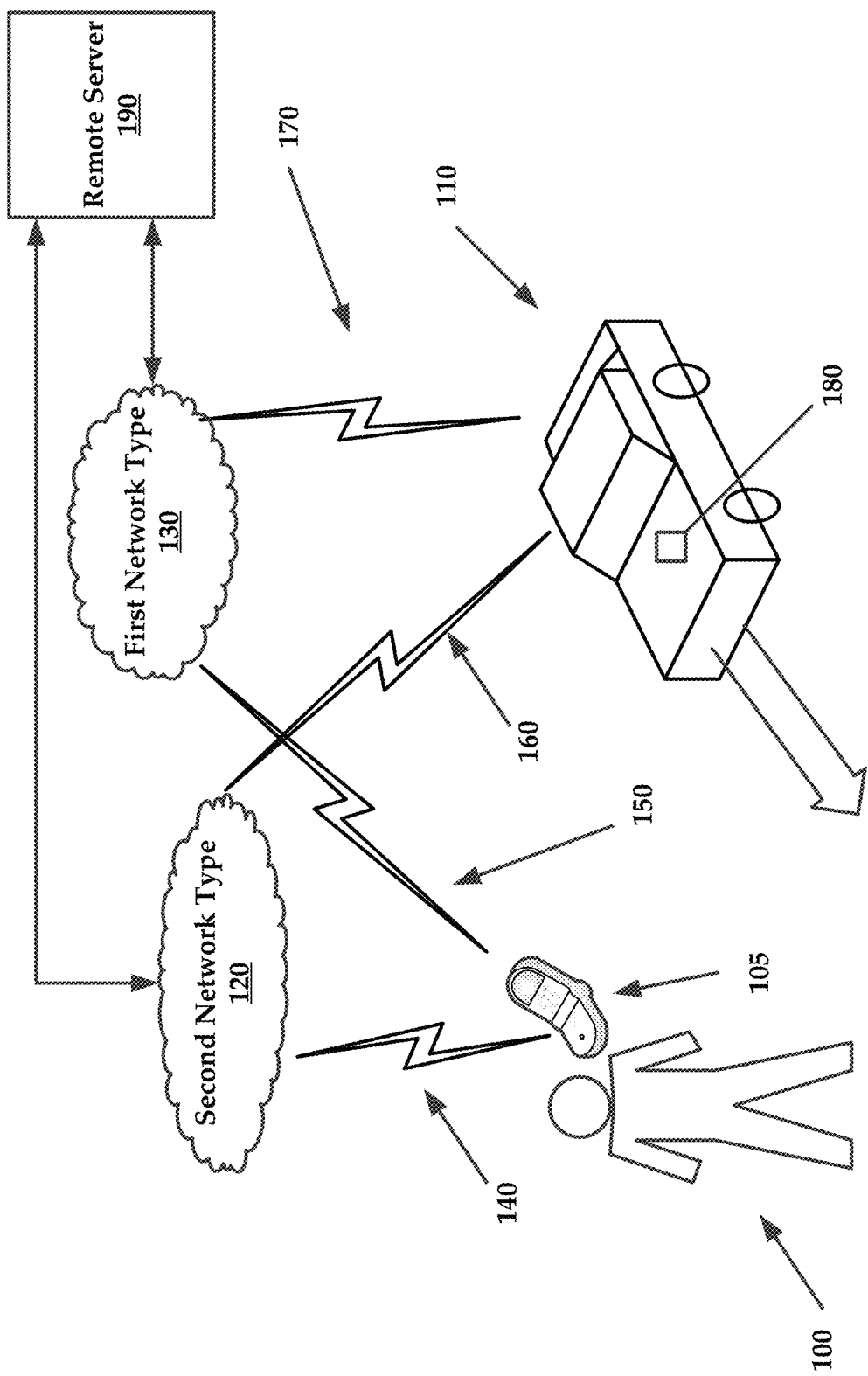
FIG. 2 is a schematic diagram of another system that implements the present technology.

FIG. 2 is another embodiment of the present technology. An automobile 110 may have a mobile communications device 180 inside, which may be integrated in automobile 110 or carried within automobile 110. For example, the mobile communications device may include the Smartphone 105. The mobile communications device 180 in automobile 110 is making a telephone call and/or using a data resource (e.g., email or the Internet), and receives signal 160 from second network type 120 and signal 170 from a first network type 130. In some instances, the Smartphone 105 may establish a small cell network, such as a hotspot, with the first network type 130.

In some embodiments, the mobile communications device 180 of the automobile 110 may send period signals to a remote server 190 that include location based data, or can be processed by the remote server 190 to infer location based information or movement. For example, the mobile communications device 180 may send route update messages or other types of messages that report wireless link data, which may include location based information for the mobile communications device 180.

It will be understood that the remote server 190 may include a cellular transceiver such as a cellular base station.

The remote server 190 may also include an application server that is configured to provide services, such as subscription-based communications, to the automobile 110 over a wireless link.

The remote server 190 monitors the location and/or movement of the automobile 110 over time to determine if the automobile is stationary. The remote server 190 may utilize any one or combination of methods for determining if the automobile 110 is moving or stationary. Also, the remote server may determine the velocity or acceleration of automobile, and use this information to determine if the automobile, and specifically the mobile communications device 180, should use the first or second network type.

The remote server 190 may utilize rules and/or thresholds for determining network selection as a function of the movement of the automobile. For example, if the automobile is moving at a rate of speed of less than twenty five miles per hour, the remote server 190 may infer that the automobile will remain in a localized area for a period of time. Thus, the remote server 190 may allow the automobile 110 to couple with (or remain coupled with) the second network type 120. For example, a small cell network, such as a femtocell or WiFi may be of the second network type that has a reduced (or no) capacity to hand off active sessions for the automobile 110.

If the remote server 190 determines that the automobile is moving at a high rate of speed, the remote server 190 may instruct the automobile 110 to use first network type 130. In another example, the remote server 190 may not be able to determine or infer the speed of travel of the automobile because the remote server 190 cannot obtain enough data to determine a rate of speed, but may have only one (or relatively few) location based information signals that place the automobile on a freeway or highway. The remote server 190 may determine that the automobile is likely on a highway from evaluating one location based data point. The remote server 190 may instruct the automobile to use the first network type 130. These examples are merely use cases for thresholds or rules that may be utilized to determine if a mobile device should be instructed to use a small or macro cell network.

By way of another example, if the remote server 190 determines that the automobile 110 is stationary, the mobile communications device 180 in automobile 110 may be instructed by the remote server 190 to use the second network type 120. The remote server 190 may alternatively use triangulation of signals received from the mobile communications device 180 to determine speed or infer movement of the automobile 110. Alternatively, if the automobile 110 is moving at a sufficient pace that handovers between adjacent WiFi and/or small cell networks (e.g., reduced handoff capacity networks) would be difficult or impossible, then mobile communications device 180 in automobile 110 may be instructed to use first network type 130, which may be a macro-cell network.

In another embodiment, the mobile communications device 180 may utilize the small cell network established between the Smartphone 105 and the first network type 130, which is of the first network type (e.g., capable of handing off active user sessions). If necessary, the mobile communications device 180 may be configured to use the small cell network (e.g., hotspot network) by storing in the mobile communications device 180 a service set identifier (SSID) and password (if necessary). The mobile communications device 180 may use a WiFi network, for example, if the automobile is within range of a public or private WiFi network, if the automobile is authorized to utilize such networks.

As with the embodiment of FIG. 1, the embodiment described in FIG. 2 could alternatively include the mobile communications device 180 performing the methods described above, rather than employing the use of a remote server 190.

As mentioned above, the mobile communications device 180 may be configured to override instructions from the remote server 190 when signal strength indicates that the network selected for the mobile communications device 180 by the remote server 190 is below an acceptable threshold. For example, the remote server 190 may determine that the automobile is stationary. Additionally, the automobile may appear to be within range of a public WiFi network that is open and accessible to the mobile communications device 180. Unfortunately, the automobile is on the outermost boundary of the WiFi network and the signal strength is poor. The mobile communications device 180 may determine that the macro cell network should be used rather than the WiFi network because the macro cell network provides a more robust wireless link throughput. Thus, the requisite logic to perform network selection may reside on both the remote server 190 and the mobile communications device 180.

Also, the mobile communications device 180 may consider the communications sessions that are currently active. Session type, along with network bandwidth or signal strength may be evaluated in combination to select an appropriate network. For example, if the mobile communications device 180 is engaged in data intensive sessions, such as media streaming, a voice conversation, and/or a navigation session, the mobile communications device 180 may prefer the network with the highest available bandwidth.

Figure 3:
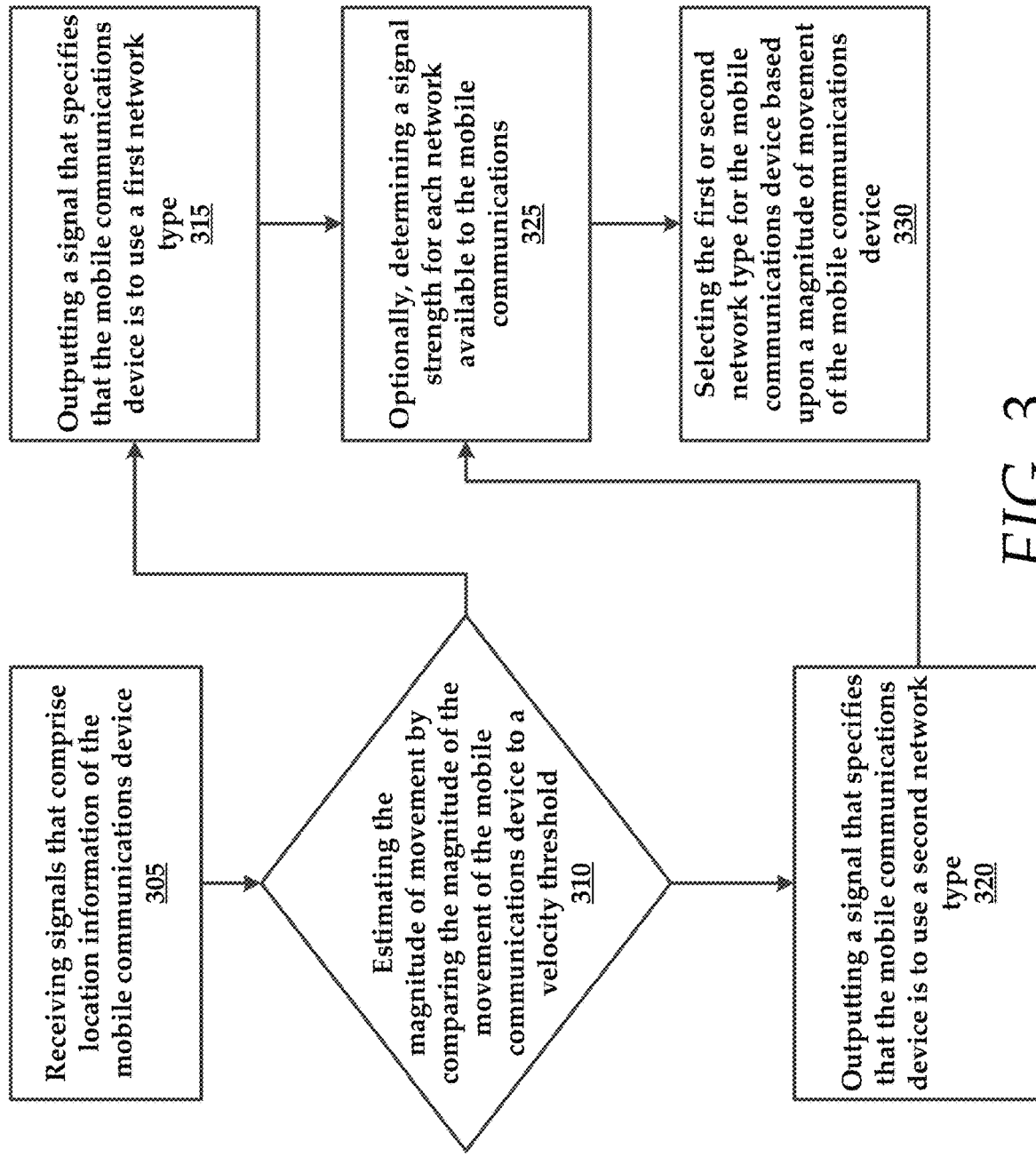
FIG. 3 is a flowchart of a method for selecting a network connection for a mobile communications device.

FIG. 3 is a flowchart of an exemplary method for network selection for a mobile device. In some embodiments the method includes receiving 305 signals that comprise location information of the mobile communications device. For example, a GPS module in a mobile communications device may receive GPS location signals that are indicative of a location of the mobile communications device. In another example, a remote server may receive signals that are indicative of the location of a mobile communications device such as GPS location data or triangulation data, as well as other signals that would be known by one ordinary skill in the art with the present disclosure before them. In some instances, rather than receiving strictly location based information, the mobile communications device (or remote server) may receive a signal that is indicative of the movement of the mobile communications device, such as velocity, acceleration, or other similar data.

In some instances, the method may include estimating 310 the magnitude of movement by comparing the magnitude of the movement of the mobile communications device to a velocity threshold. Next, if the magnitude of the movement meets or exceeds the threshold the method includes outputting 315 a signal that specifies that the mobile communications device is to use the first network type. Alternatively, if the magnitude of the movement does not meet or exceed the threshold, the method includes outputting 320 a signal that specifies that the mobile communications device is to use the second network type As mentioned above, the second network type network may include a microcell network established by a second communications device such as a microcell established by a vehicle. The mobile communications device may include a Smartphone used by the driver of the vehicle. In these instances, if the mobile communications device is instructed to use the second network type, the mobile communications device will couple with the second communications device as a proxy to use the microcell network.

In some instances, the method may further comprise determining 325 a signal strength for each network communications networks available to the mobile communications.

The method may also include selecting 330 the first or second network type for the mobile communications device based upon a magnitude of movement of the mobile communications device. For example, this may include determining or inferring velocity of the mobile communications device by comparing time stamps or time frame data associated with each location based signal. Other methods for inferring movement may include comparing a location of the mobile communications device with landmarks or other objects on a map, such as a highway or a parking lot. For example, if the location signal indicates that the mobile communications device is in a parking lot, the selected network may include a small cell network or WiFi network or other network that has a reduced capacity (or no capacity) to hand off user sessions. If a known public WiFi network is determined from evaluation of the map location, and access credentials for the WiFi network are known to the system, the method may include providing the appropriate credentials to the mobile communications device, allowing the mobile communications device to access the network.

In some instances, the signal strength may also be utilized in combination with the velocity or movement of the mobile device. Again, this method may be executed by the mobile communications device alone or in conjunction with a remote server that transmits signals to the mobile communications device to inform the mobile communications device as to which network to select.

Figure 4:
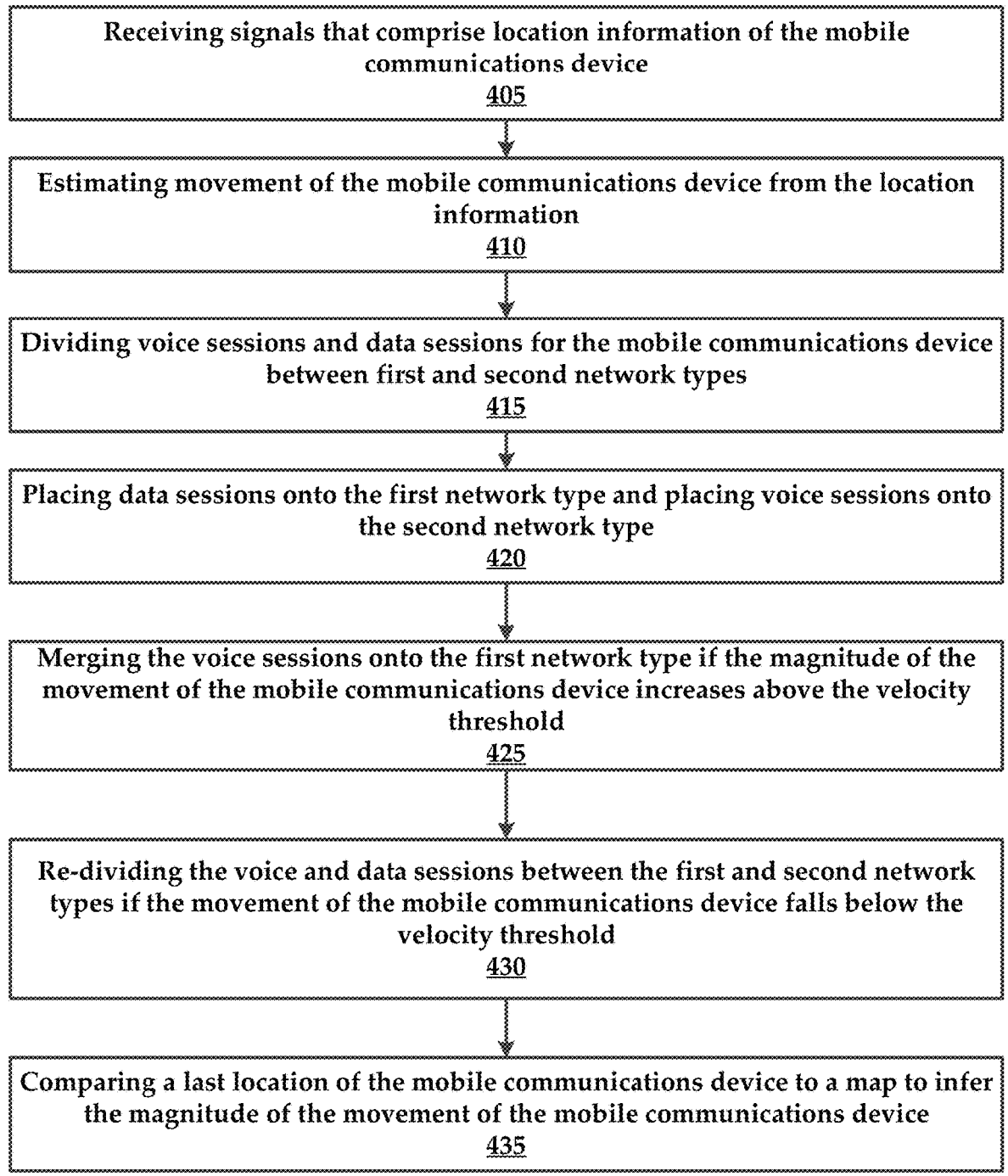
FIG. 4 is a flowchart of another method for selecting a network connection for a mobile communications device.

FIG. 4 illustrates an exemplary method for selecting a network connection for a mobile communications device. The method may include receiving 405 signals that comprise location information of the mobile communications device, using any of the methods or processes described above. In some instances, the method includes estimating 410 movement of the mobile communications device from the location information. Again, this may include determining a magnitude of movement or velocity of the mobile device.

Based upon a magnitude of the movement of the mobile communications device, the method may include dividing 415 voice sessions and data sessions for the mobile communications device between first and second network types.

For example, if the voice sessions are placed onto a small communications network, the method may include placing 420 data sessions onto the first network type and placing voice sessions onto the second network type.

According to some embodiments, the method may include merging 425 the voice sessions onto the first network type if the magnitude of the movement of the mobile communications device increases above the velocity threshold.

The method may also further comprise re-dividing 430 the voice and data sessions between the first and second network types if the movement of the mobile communications device falls below the velocity threshold. Thus, the process can vacillate between merging and dividing the voice and data sessions as necessary, depending upon the movement of the mobile device.

If the magnitude of the movement of the mobile communications device cannot be measured, the method may include an optional step of comparing 435 a last location of the mobile communications device to a map to infer the magnitude of the movement of the mobile communications device.

Figure 5:
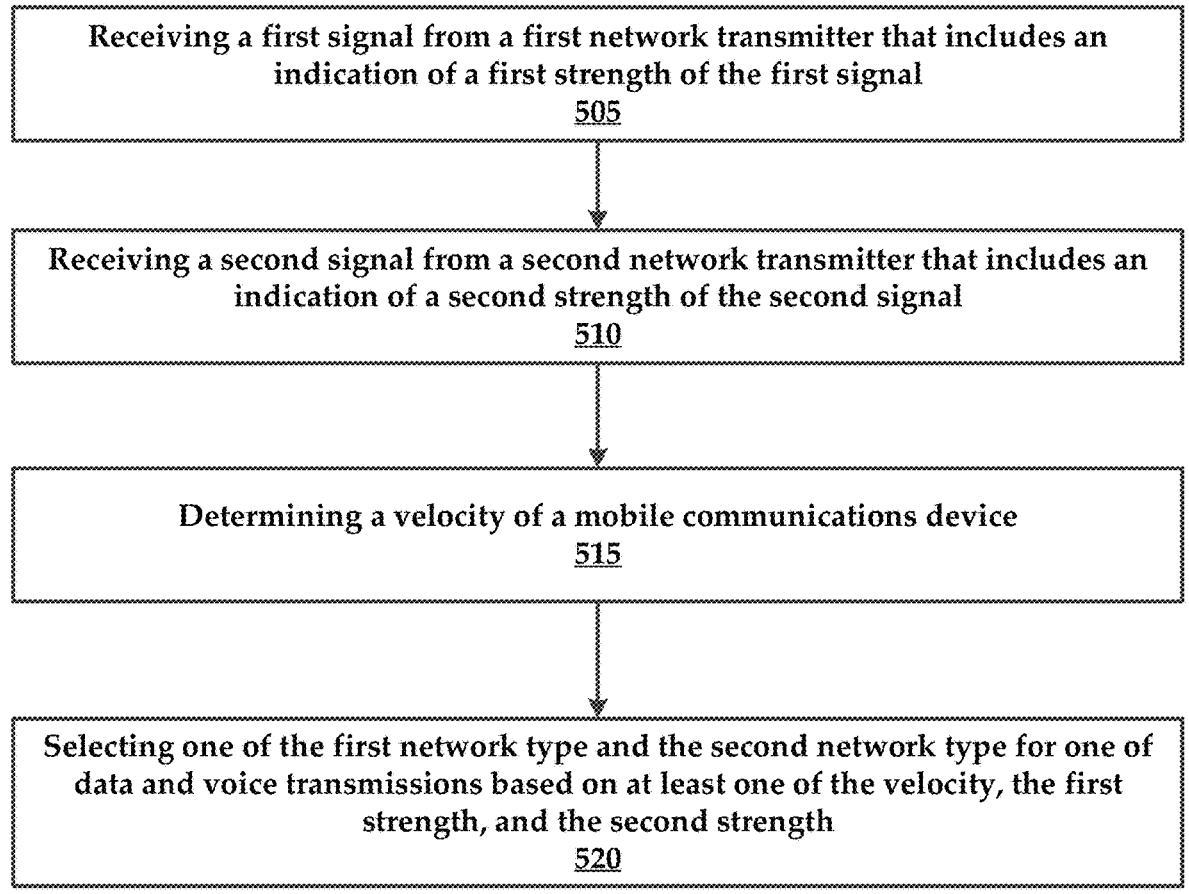
FIG. 5 is a flowchart of another exemplary method for selecting a network connection for a mobile communications device.

FIG. 5 is a flowchart of a method for selecting a network for a mobile device. The method may include receiving 505 a first signal from a first network transmitter (such as a cell tower of a macro cell network). The first signal includes an indication of a first strength of the first signal. Also, the method includes receiving 510 a second signal from a second network transmitter (such as a small cell network). The second signal includes an indication of a second strength of the second signal.

The method may further include determining 515 a velocity of a mobile communications device, as well as selecting 520 one of the first network type and the second network type for one of data and voice transmissions based on at least one of the velocity, the first strength, and the second strength. Thus, the process for selecting an appropriate network may be based on a first network signal strength, a second network signal strength, a mobility/movement of the device, or any combinations thereof.

Figure 6:
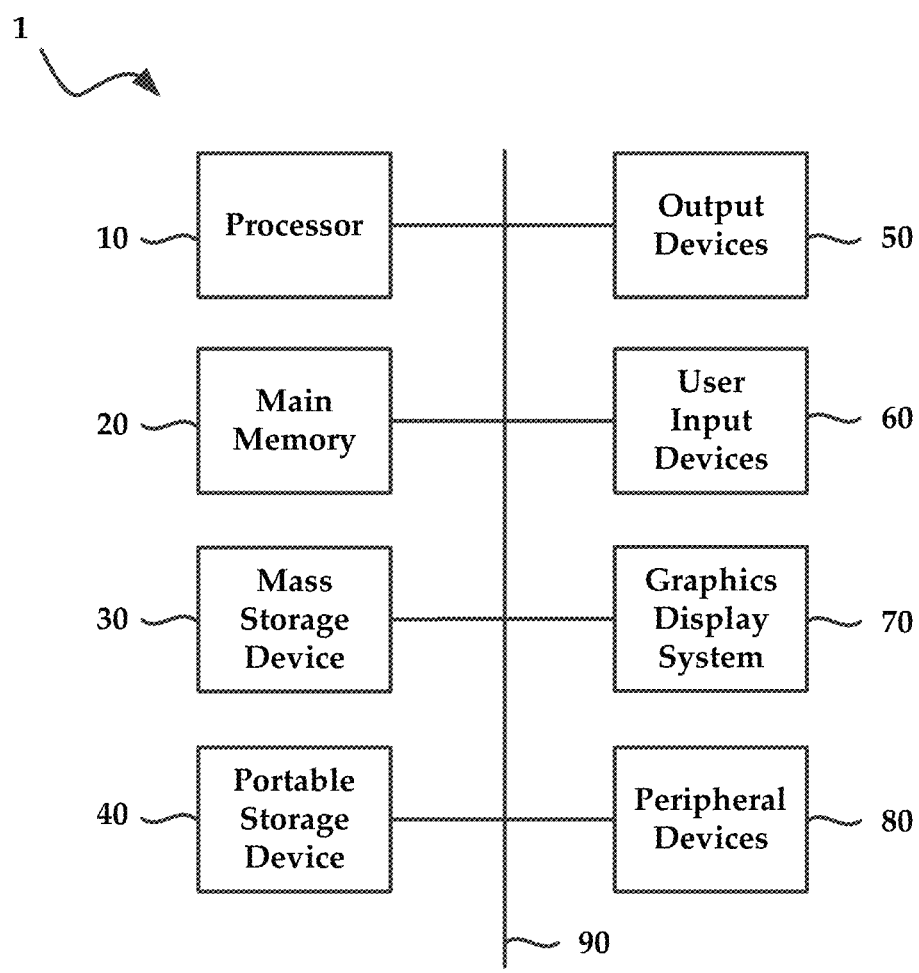
FIG. 6 illustrates an exemplary computing system that may be used to implement embodiments according to the present technology.

FIG. 6 illustrates an exemplary computing device 1 that may be used to implement an embodiment of the present systems and methods. The system 1 of FIG. 6 may be implemented in the contexts of the likes of clients, information display systems, computing devices, terminals, networks, servers, or combinations thereof. The computing device 1 of FIG. 6 includes a processor 10 and main memory 20. Main memory 20 stores, in part, instructions and data for execution by processor 10. Main memory 20 may store the executable code when in operation. The system 1 of FIG. 6 further includes a mass storage device 30, portable storage device 40, output devices 50, user input devices 60, a graphics display system 70, and peripherals 80.

The components shown in FIG. 6 are depicted as being connected via a single bus 90. The components may be connected through one or more data transport means. Processor 10 and main memory 20 may be connected via a local microprocessor bus, and the mass storage device 30, peripherals 80, portable storage device 40, and display system 70 may be connected via one or more input/output (I/O) buses.

Mass storage device 30, which may be implemented with a magnetic disk drive or an optical disk drive, is a non-volatile storage device for storing data and instructions for use by processor 10. Mass storage device 30 can store the system software for implementing embodiments of the present technology for purposes of loading that software into main memory 20.

Portable storage device 40 operates in conjunction with a portable non-volatile storage medium, such as a floppy disk, compact disk or digital video disc, to input and output data and code to and from the computing system 1 of FIG. 6. The system software for implementing embodiments of the present technology may be stored on such a portable medium and input to the computing system 1 via the portable storage device 40.

Input devices 60 provide a portion of a user interface. Input devices 60 may include an alphanumeric keypad, such as a keyboard, for inputting alphanumeric and other information, or a pointing device, such as a mouse, a trackball, stylus, or cursor direction keys. Additionally, the system 1 as shown in FIG. 6 includes output devices 50. Suitable output devices include speakers, printers, network interfaces, and monitors.

Graphics display system 70 may include a liquid crystal display (LCD) or other suitable display device. Graphics display system 70 receives textual and graphical information, and processes the information for output to the display device. Peripherals 80 may include any type of computer support device to add additional functionality to the computing system. Peripherals 80 may include a modem or a router.

The components contained in the computing system 1 of FIG. 6 are those typically found in computing systems that may be suitable for use with embodiments of the present technology and are intended to represent a broad category of such computer components that are well known in the art. Thus, the computing system 1 can be a personal computer, hand held computing system, telephone, mobile computing system, workstation, server, minicomputer, mainframe computer, or any other computing system. The computer can also include different bus configurations, networked platforms, multi-processor platforms, etc. Various operating systems can be used including UNIX, Linux, Windows, Macintosh OS, Palm OS, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the technology. Those skilled in the art are familiar with instructions, processor(s), and storage media.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASHEPROM, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

Aspects of the present technology are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A method for selecting a network connection for a mobile communications device, the method comprising:
   receiving signals that comprise location information of the mobile communications device integrated into a vehicle, the signals being route update messages for the vehicle;
   selecting a first network type or a second network type for the mobile communications device based upon a magnitude of a movement of the vehicle determined from the location information, the first network type comprising a network that is capable of handing off active sessions for the mobile communications device, the second network type comprising a network having a reduced capacity or no capacity to hand off active sessions for the mobile communications device; and
   when the magnitude of the movement of the vehicle cannot be measured, comparing a last location of the vehicle to a map to infer the magnitude of the movement of the vehicle.

2. The method according to claim 1, further comprising estimating the magnitude of movement of the vehicle by:
   comparing the magnitude of the movement of the vehicle to a velocity threshold;
   when the magnitude of the movement meets or exceeds the velocity threshold the method includes outputting a signal that specifies that the vehicle is to use the first network type; and
   when the magnitude of the movement does not meet or exceed the velocity threshold the method includes outputting a signal that specifies that the vehicle is to use the second network type.

3. The method according to claim 1, wherein the second network type includes at least one of an ad-hoc network, a microcell, a femtocell, and a WiFi network.

4. The method according to claim 1, wherein the second network type comprises a microcell network established by a second communications device, the mobile communications device being coupled with the second communications device as a proxy to use the microcell network.

5. The method according to claim 1, further comprising determining a signal strength for each network available to the mobile communications, and wherein selecting further comprises selecting the first or second network type based upon both the signal strength of available networks and the magnitude of the movement of the mobile communications device.

6. A method for selecting a network connection for a mobile communications device, the method comprising:
   receiving signals that comprise location information of the mobile communications device integrated into a vehicle, the signals being route update messages for the vehicle;
   estimating movement of the mobile communications device from the location information;
   dividing voice sessions and data sessions for the mobile communications device between a first network type and a second network type-based upon a magnitude of a movement of the vehicle, the first network type comprising a network that is capable of handing off active sessions for the mobile communications device, the second network type comprising a network having a reduced capacity or no capacity to hand off active sessions for the mobile communications device, the vehicle storing a service set identifier and a password for accessing the first network type; and
   when the magnitude of the movement of the vehicle cannot be measured, comparing a last location of the vehicle to a map to infer the magnitude of the movement of the vehicle.

7. The method according to claim 6, wherein when the voice sessions are placed onto the second network type the data sessions are placed onto the first network type.

8. The method according to claim 6, wherein estimating comprises comparing the magnitude of the movement of the vehicle to a velocity threshold.

9. The method according to claim 8, further comprising merging the voice sessions onto the first network type when the magnitude of the movement of the vehicle increases above the velocity threshold.

10. The method according to claim 9, further comprising re-dividing the voice and data sessions between the first and second network types when the movement of the vehicle falls below the velocity threshold.

11. The method according to claim 8, further comprising merging the voice sessions onto the first network type when a signal strength of the second network type falls below a signal threshold.

12. The method according to claim 8, wherein the second network type includes at least one of an ad-hoc network, a microcell, a femtocell, and a WiFi network.

13. A method, comprising:
   receiving a first signal from a first network transmitter, the first signal including an indication of a first strength of the first signal pf a first network type;
   receiving a second signal from a second network transmitter, the second signal including an indication of a second strength of the second signal of a second network type;

determining signals that comprise location information of a mobile communications device integrated into a vehicle, the signals being route update messages for the vehicle;

selecting one of the first network type and the second network type for one of data and voice transmissions based on at least one of a magnitude of a movement of the vehicle, the first strength, and the second strength, the vehicle storing a service set identifier and a password for accessing the first network type; and when the magnitude of the movement of the vehicle cannot be measured, comparing a last location of the vehicle to a map to infer the magnitude of the movement of the vehicle.

14. The method according to claim 13, further comprising:

comparing the magnitude of the movement of the vehicle to a velocity threshold;

when the magnitude of the movement meets or exceeds the velocity threshold the method includes outputting a signal that specifies that the mobile communications device is to use the first network type; and when the magnitude of the movement does not meet or exceed the velocity threshold the method includes outputting a signal that specifies that the mobile communications device is to use the second network type.

15. The method according to claim 14, wherein the first network type includes a macro cell network and the second network type includes at least one of an ad-hoc network, a microcell, a femtocell, and a WiFi network.

16. The method according to claim 15, wherein based upon the magnitude of the movement of the vehicle, the method comprises dividing voice sessions and data sessions for the mobile communications device1 between the first network type and the second network type.

17. The method according to claim 16, wherein when the voice sessions are placed onto the second network type the data sessions are placed onto the first network type.

18. The method according to claim 17, wherein the second network type comprises a microcell network established by a second communications device, the mobile communications device being coupled with the second communications device as a proxy to use the microcell network.

19. A mobile communications device, comprising:

a processor; and a memory for storing executable instructions, the instructions being executed by the processor to:

receive signals that comprise location information of the mobile communications device integrated into a vehicle, the signals being route update messages for the vehicle;

select a first network type or a second network type for the mobile communications device based upon a magnitude of a movement of the vehicle determined from the location information, the first network type comprising a network that is capable of handing off active sessions for the mobile communications device, the second network type comprising a network having a reduced capacity or no capacity to hand off active sessions for the mobile communications device; and when the magnitude of the movement of the vehicle cannot be measured, compare a last location of the vehicle to a map to infer the magnitude of the movement of the vehicle.

\* \* \* \* \*